United States Patent
Carvell et al.

(10) Patent No.: US 11,888,424 B1
(45) Date of Patent: Jan. 30, 2024

(54) METHODS FOR IMPROVING RATE OF RISE OF TORQUE IN ELECTRIC MACHINES WITH STATOR CURRENT BIASING

(71) Applicant: Tula eTechnology, Inc., San Jose, CA (US)

(72) Inventors: Paul Carvell, San Jose, CA (US); Philippe Farah, Maisons-Laffitte (FR)

(73) Assignee: Tula eTechnology, Inc., San Jose, CA (US)

( * ) Notice: Subject to any disclaimer, the term of this patent is extended or adjusted under 35 U.S.C. 154(b) by 0 days.

(21) Appl. No.: 18/200,264

(22) Filed: May 22, 2023

Related U.S. Application Data

(60) Provisional application No. 63/390,113, filed on Jul. 18, 2022.

(51) Int. Cl.
*H02P 25/064* (2016.01)
*H02P 27/08* (2006.01)

(52) U.S. Cl.
CPC .................. *H02P 27/085* (2013.01)

(58) Field of Classification Search
CPC ...... H03M 3/456; H03M 3/438; H03M 3/458; H02P 23/0004; H02P 27/085; H02P 27/08
See application file for complete search history.

(56) References Cited

U.S. PATENT DOCUMENTS

| | | | |
|---|---|---|---|
| 3,020,651 A | 2/1962 | Schierhorst | |
| 4,441,043 A | 4/1984 | DeCesare | |
| 4,989,146 A | 1/1991 | Imajo | |
| 5,099,410 A | 3/1992 | Divan | |
| 5,151,637 A | 9/1992 | Takada et al. | |
| 5,325,028 A | 6/1994 | Davis | |
| 5,483,141 A | 1/1996 | Uesugi | |
| 5,640,073 A | 6/1997 | Ikeda et al. | |

(Continued)

FOREIGN PATENT DOCUMENTS

| CN | 1829070 A | 9/2006 |
|---|---|---|
| CN | 102381265 A | 3/2012 |

(Continued)

OTHER PUBLICATIONS

International Search Report and Written Opinion for PCT/IB22/56551 dated Oct. 28, 2022.

(Continued)

*Primary Examiner* — Kawing Chan
*Assistant Examiner* — Gabriel Agared
(74) *Attorney, Agent, or Firm* — Womble Bond Dickinson (US) LLP

(57) ABSTRACT

A method of controlling an electric machine having a separately excitable rotor and stator includes pulsing the electric machine and controlling the electric machine to an OFF state. Pulsing the electric machine includes exiting the rotor with direction current and the stator with a stator biasing current at the same time to generate magnetic flux in the rotor via two separate paths. Pulsing the electric machine may also include terminating the stator basing current when a desired magnetic flux is generated in the rotor. Pulsing the electric machine may include proving a stator flux to the stator such that the electric machine provides a pulse torque.

17 Claims, 10 Drawing Sheets

(56) References Cited

U.S. PATENT DOCUMENTS

| | | |
|---|---|---|
| 5,701,062 A | 12/1997 | Barrett |
| 5,731,669 A | 3/1998 | Shimizu et al. |
| 6,121,740 A | 9/2000 | Gale et al. |
| 6,291,960 B1 | 9/2001 | Crombez |
| 6,308,123 B1 | 10/2001 | Ikegaya et al. |
| 6,370,049 B1 | 4/2002 | Heikkilä |
| 6,424,799 B1 | 7/2002 | Gilmore |
| 6,493,204 B1 | 12/2002 | Glidden et al. |
| 6,605,912 B1 | 8/2003 | Bharadwaj et al. |
| 6,829,515 B2 | 12/2004 | Grimm |
| 6,829,556 B2 | 12/2004 | Kumar |
| 6,906,485 B2 | 6/2005 | Hussein |
| 6,940,239 B2 | 9/2005 | Iwanaga et al. |
| 7,190,143 B2 | 3/2007 | Wei et al. |
| 7,259,664 B1 | 8/2007 | Cho et al. |
| 7,327,545 B2 | 2/2008 | Konishi |
| 7,411,801 B2 | 8/2008 | Welchko et al. |
| 7,453,174 B1 | 11/2008 | Kalsi |
| 7,558,655 B2 | 7/2009 | Garg et al. |
| 7,577,511 B1 | 8/2009 | Tripathi et al. |
| 7,616,466 B2 | 11/2009 | Chakrabarti et al. |
| 7,768,170 B2 | 8/2010 | Tatematsu et al. |
| 7,852,029 B2 | 12/2010 | Kato et al. |
| 7,960,888 B2 | 6/2011 | Ai et al. |
| 7,969,341 B2 | 6/2011 | Robbe et al. |
| 8,020,651 B2 | 9/2011 | Zillmer et al. |
| 8,099,224 B2 | 1/2012 | Tripathi et al. |
| 8,768,563 B2 | 7/2014 | Nitzberg et al. |
| 8,773,063 B2 | 7/2014 | Nakata |
| 9,046,559 B2 | 6/2015 | Lindsay et al. |
| 9,050,894 B2 | 6/2015 | Banerjee et al. |
| 9,308,822 B2 | 4/2016 | Matsuda |
| 9,495,814 B2 | 11/2016 | Ramesh |
| 9,512,794 B2 | 12/2016 | Serrano et al. |
| 9,630,614 B1 | 4/2017 | Hill et al. |
| 9,702,420 B2 | 7/2017 | Yoon |
| 9,758,044 B2 | 9/2017 | Gale et al. |
| 9,948,173 B1 | 4/2018 | Abu Qahouq |
| 10,060,368 B2 | 8/2018 | Pirjaberi et al. |
| 10,081,255 B2 | 9/2018 | Yamada et al. |
| 10,256,680 B2 | 4/2019 | Hunstable |
| 10,273,894 B2 | 4/2019 | Tripathi |
| 10,291,168 B2 | 5/2019 | Fukuta |
| 10,291,174 B2 | 5/2019 | Irie et al. |
| 10,320,249 B2 | 6/2019 | Okamoto et al. |
| 10,340,821 B2 | 7/2019 | Magee et al. |
| 10,344,692 B2 | 7/2019 | Nagashima et al. |
| 10,381,968 B2 | 8/2019 | Agirman |
| 10,476,421 B1 | 11/2019 | Khalil et al. |
| 10,550,776 B1 | 2/2020 | Leone et al. |
| 10,742,155 B2 | 8/2020 | Tripathi |
| 10,763,772 B1 | 9/2020 | Fatemi et al. |
| 10,944,352 B2 | 3/2021 | Mazda et al. |
| 11,077,759 B1 | 8/2021 | Srinivasan |
| 11,088,644 B1 | 8/2021 | Carvell |
| 11,133,763 B1 | 9/2021 | Islam |
| 11,133,767 B2 | 9/2021 | Serrano et al. |
| 11,167,648 B1 | 11/2021 | Carvell et al. |
| 11,228,272 B2 | 1/2022 | Tripathi |
| 11,345,241 B1 | 5/2022 | Cai |
| 11,427,177 B2 | 8/2022 | Serrano et al. |
| 11,557,996 B1 | 1/2023 | Arvanitis |
| 11,628,730 B2 | 4/2023 | Srinivasan |
| 11,637,513 B2 | 4/2023 | Phillips et al. |
| 11,673,476 B2 | 6/2023 | Cai |
| 11,695,361 B2 | 7/2023 | Carvell et al. |
| 2001/0039926 A1 | 11/2001 | Kobayashi et al. |
| 2002/0043954 A1 | 4/2002 | Hallidy |
| 2005/0127861 A1 | 6/2005 | McMillan et al. |
| 2005/0151437 A1 | 7/2005 | Ramu |
| 2005/0160771 A1 | 7/2005 | Hosoito et al. |
| 2006/0197396 A1* | 9/2006 | Pollock .................. H02P 6/182 |
| | | 310/166 |
| 2007/0216345 A1 | 9/2007 | Kanamori |
| 2007/0287594 A1 | 12/2007 | DeGeorge et al. |
| 2008/0079375 A1* | 4/2008 | Seguchi .................. H02P 27/08 |
| | | 318/722 |
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0121669 A1 | 5/2009 | Hanada |
| 2009/0128072 A1 | 5/2009 | Strong et al. |
| 2009/0146615 A1 | 6/2009 | Zillmer et al. |
| 2009/0179604 A1* | 7/2009 | Johnson ................. H02K 19/12 |
| | | 318/400.34 |
| 2009/0179608 A1 | 7/2009 | Welchko et al. |
| 2009/0306841 A1 | 12/2009 | Miwa et al. |
| 2010/0010724 A1 | 1/2010 | Tripathi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0089774 A1 | 4/2011 | Kramer |
| 2011/0101812 A1 | 5/2011 | Finkle et al. |
| 2011/0106350 A1 | 5/2011 | Jalbout et al. |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217916 A1 | 8/2012 | Wu et al. |
| 2012/0217921 A1 | 8/2012 | Wu et al. |
| 2013/0002173 A1 | 1/2013 | Baglino et al. |
| 2013/0134912 A1 | 5/2013 | Khalil et al. |
| 2013/0141027 A1 | 6/2013 | Nakata |
| 2013/0226420 A1 | 8/2013 | Pedlar et al. |
| 2013/0241445 A1 | 9/2013 | Tang |
| 2013/0258734 A1 | 10/2013 | Nakano et al. |
| 2014/0018988 A1 | 1/2014 | Kitano et al. |
| 2014/0028225 A1 | 1/2014 | Takamatsu et al. |
| 2014/0130506 A1 | 5/2014 | Gale et al. |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |
| 2015/0025725 A1 | 1/2015 | Uchida |
| 2015/0240404 A1 | 8/2015 | Kim et al. |
| 2015/0246685 A1 | 9/2015 | Dixon et al. |
| 2015/0261422 A1 | 9/2015 | den Haring et al. |
| 2015/0297824 A1 | 10/2015 | Cabiri et al. |
| 2015/0318803 A1 | 11/2015 | Wu |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0373047 A1 | 12/2016 | Loken et al. |
| 2017/0063277 A1* | 3/2017 | Li .............................. H02P 3/26 |
| 2017/0087990 A1 | 3/2017 | Neti et al. |
| 2017/0163108 A1 | 6/2017 | Schencke et al. |
| 2017/0170762 A1* | 6/2017 | Blackwelder ............. H02P 9/08 |
| 2017/0331402 A1 | 11/2017 | Smith et al. |
| 2018/0032047 A1 | 2/2018 | Nishizono et al. |
| 2018/0045771 A1 | 2/2018 | Kim et al. |
| 2018/0154786 A1 | 6/2018 | Wang et al. |
| 2018/0276913 A1 | 9/2018 | Garcia et al. |
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0288629 A1 | 9/2019 | Tripathi |
| 2019/0288631 A1 | 9/2019 | Tripathi |
| 2019/0341820 A1 | 11/2019 | Krizan et al. |
| 2020/0112282 A1* | 4/2020 | Katsura .................. H02K 11/33 |
| 2020/0212834 A1 | 7/2020 | Mazda et al. |
| 2020/0262398 A1 | 8/2020 | Sato et al. |
| 2020/0328714 A1 | 10/2020 | Tripathi |
| 2020/0343849 A1 | 10/2020 | Coroban-Schramel |
| 2020/0366223 A1 | 11/2020 | Coroban-Schramel |
| 2021/0146909 A1 | 5/2021 | Serrano et al. |
| 2021/0203263 A1 | 7/2021 | Serrano et al. |
| 2021/0351733 A1 | 11/2021 | Carvell |

(56) References Cited

U.S. PATENT DOCUMENTS

| | | |
|---|---|---|
| 2022/0234451 A1 | 7/2022 | Srinivasan |
| 2023/0223885 A1 | 7/2023 | Tripathi |

FOREIGN PATENT DOCUMENTS

| | | |
|---|---|---|
| CN | 104716754 A | 6/2015 |
| CN | 204589885 U | 8/2015 |
| CN | 105196877 A | 12/2015 |
| CN | 205229379 U | 5/2016 |
| CN | 106932208 A | 7/2017 |
| CN | 107067780 A | 8/2017 |
| CN | 207129052 U | 3/2018 |
| CN | 108216026 A | 6/2018 |
| CN | 108445386 A | 8/2018 |
| CN | 110212725 A | 9/2019 |
| DE | 102014206342 A1 | 10/2015 |
| EP | 2605398 A1 | 6/2013 |
| FR | 2989479 B1 | 3/2014 |
| GB | 2273212 A | 6/1994 |
| JP | 10-243680 A | 9/1998 |
| JP | 2008-079686 A | 4/2008 |
| JP | 2009-065758 A | 3/2009 |
| JP | 201167043 A | 3/2011 |
| JP | 2014-033449 A | 2/2014 |
| JP | 2017-011970 A | 1/2017 |
| JP | 2017-200382 A | 11/2017 |
| JP | 2018-033250 A | 3/2018 |
| KR | 1020100021146 | 2/2010 |
| KR | 1020170021146 A | 2/2017 |
| KR | 1020170032976 A | 3/2017 |
| RU | 2543503 C1 | 3/2015 |
| WO | 03/36787 A1 | 5/2003 |
| WO | 2011086562 A1 | 7/2011 |
| WO | 2012-010993 A2 | 1/2012 |
| WO | PCTUS2022020444 | 9/2022 |

OTHER PUBLICATIONS

Cai et al., "Torque Ripple Reduction for Switched Reluctance Motor with Optimized PWM Control Strategy", Energies, vol. 11, Oct. 15, 2018, pp. 1-27.

Luckjiff et al., "Hexagonal$Sigma Delta$Modulators in Power Electronics", IEEE Transactions on Power Electronics, vol. 20, No. 5, Sep. 2005, pp. 1075-1083.

Mirzaeva et al., "The use of Feedback Quantizer PWM for Shaping Inverter Noise Spectrum", Power Electronics and Motion Control Conference (EPE/PEMC), 2012 15th International IEEE, Sep. 4, 2012, pp. DS3c. 10-1, XP032311951, DOI: 10.1109/EPEPEMC.2012.6397346, ISBN: 978-1-4673-1970.6.

Ramsey, "How this father and son's new electric turbine could revolutionize electric cars; The Hunstable Electric Turbine can produce up to three times the torque of any other motor", Available Online at <https://www.autoblog.com/2020/03/08/hunstable-electric-turbine/>, Mar. 8, 2020, 9 pages.

Spong et al., "Feedback Linearizing Control of Switched Reluctance Motors", IEEE Transactions on Automatic Control, vol. AC-32, No. 5, May 1987, pp. 371-379.

"Pulse width modulation inverters; Sang-Hoon Kim, in Electric Motor Control, 2017" "https://www.sciencedirect.com/topics/engineering/sinusoidal-pulse-width-modulation" (Year: 2017).

International Search Report and the Written Opinion for PCTUS2220444, dated Jun. 29, 2022, 20 pages.

International Search Report and Written Opinion for PCT Application No. PCT/IB2022/055851, dated Sep. 1, 2022, 6 pgs.

Internation Search Report and Written Opinion for PCT/IB2023/057036 dated Sep. 5, 2023, 9 pages.

* cited by examiner

METHODS FOR IMPROVING RATE OF RISE OF TORQUE IN ELECTRIC MACHINES WITH STATOR CURRENT BIASING

CROSS-REFERENCE TO RELATED APPLICATION

This application claims the benefit of, and priority to, U.S. Provisional Patent Application Ser. No. 63/390,113, filed Jul. 18, 2022, the entire contents of which are hereby incorporated by reference.

BACKGROUND

1. Technical Field

The present disclosure relates to pulsed control of electric machines and, more specifically, to methods of improving the rate of rise of torque for externally excited synchronous machines with stator current biasing.

2. Discussion of Related Art

Wound field synchronous machines may be wound field synchronous motors (WFSM) and wound field synchronous generators (WFSG). Wound field synchronous machines, can also be referred to as an Externally Excited Synchronous machines (EESM) have a separately excited rotor and a separately exited stator. This rotor can be feed via slip rings, a rotary magnet, or a capacitively coupled rotary power transformer. Direct current can be provided to the rotor to excite the rotor and thus, produce magnetic flux of the rotor.

A multi-phase inverter can be used to generate a magnetic flux in the stator or stator flux. For example, the multi-phase inverter can be a 3-phase inverter that generates a stator flux in the stator. The magnetic flux of the rotor interacts in an air gap between the stator and the rotor with the stator flux to cause rotation of the rotor and produce power in the form on an electromotive force (EMF).

Current EESMs are designed to only require a small amount of current to be provided to the rotor compared to current provided to the stator. For example, the rotor may be provided with current in a range of 10-90 Amps and the stator may be provided with current in a range of 100-1000 Amps and sometimes greater than 1000 Amps. As a consequence, the rotor has a large number of turns and thus, high resistance and high inductance resulting in a high time constant which is not conducive to being turned On and Off at frequencies in the range of 5 to 100 Hz.

The high resistance and high inductance is not an issue when the EESM is delivering a constant level of power because once the magnetic flux of the rotor flux is established, the current provided to the rotor is not turned ON and OFF but controlled to a constant level based upon the maximum efficiency operation point of the EESM. However, when an EESM is pulsed ON and OFF such as during a Dynamic Motor Drive (DMD) control, the rotor current needs to be turned ON and OFF as fast as possible and as efficiently as possible.

SUMMARY

This disclosure relates generally to a methods of controlling electric machines to increase a rate of rise of magnetic flux in the rotor of an EESM and thus a rate of rise of torque provided by the EESM. For example, the methods disclosed herein may decrease a time for an electric machine to transition from a zero or near zero torque to a desired pulsed torque as the electric machine is pulsed ON and OFF. The methods detailed herein may be used to improve a rate of fall of magnetic flux in a rotor of an EESM. In some embodiments, the methods detailed herein may be executed on a traditional EESM which is configured to operate in a continuous control mode without consideration for pulsed control. In certain embodiments, the methods detailed herein may be executed on an EESM which has been modified to operate in a pulsed mode.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

Figure 1:
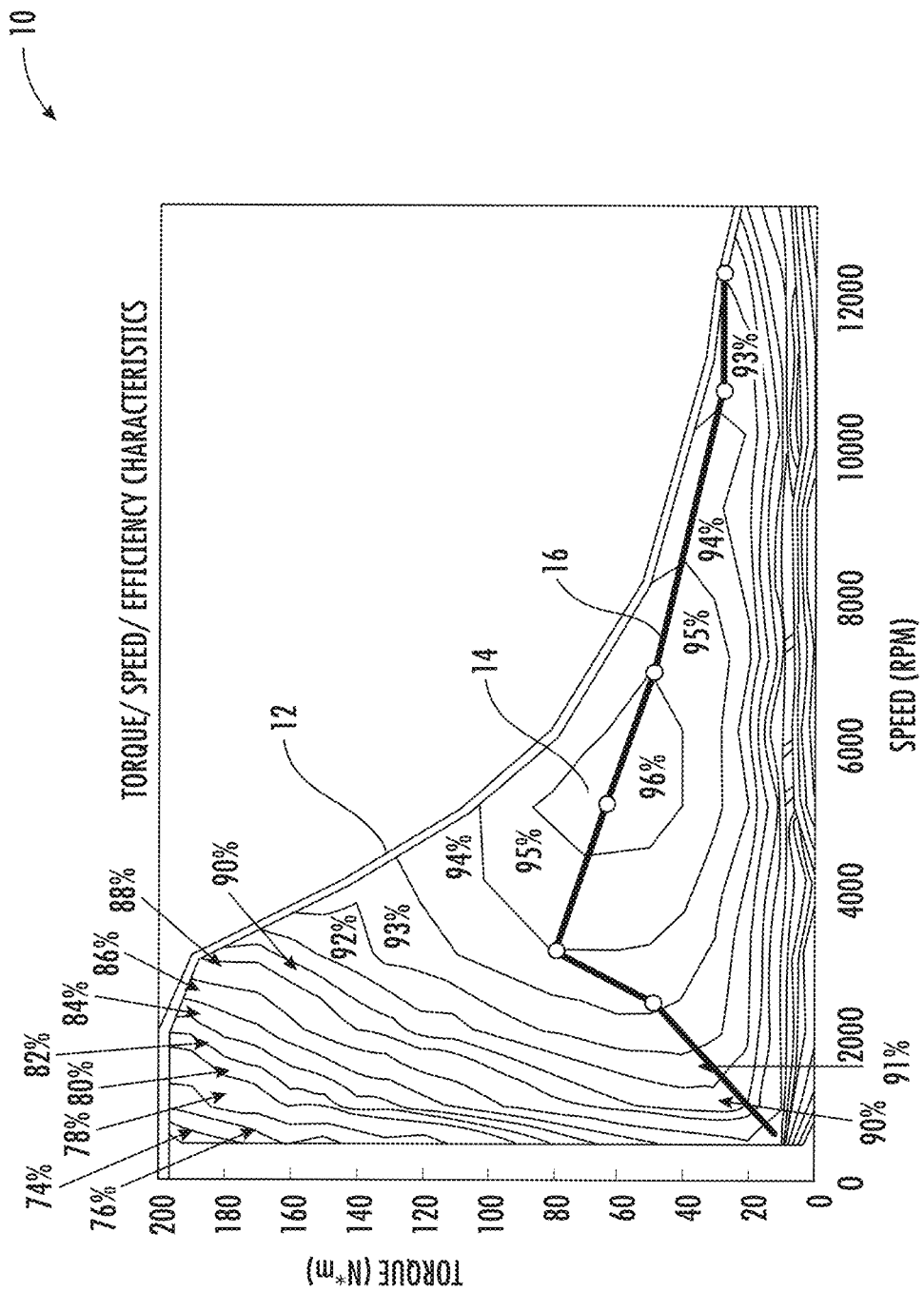
FIG. 1 is a representative Torque/Speed/Efficiency graph illustrating the energy conversion efficiency of a representative electric motor under different operating conditions.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

As used herein, the term "machine" is intended to be broadly construed to mean both electric motors and generators. Electric motors and generators are structurally very similar with both including a stator having a number of poles and a rotor. When a machine is operating as a motor, it converts electrical energy into mechanical energy and when operating as a generator, the machine converts mechanical energy into electrical energy.

Modern electric machines have relatively high energy conversion efficiencies. The energy conversion efficiency of most electric machines, however, can vary considerably based on their operational load. With many applications, a machine is required to operate under a wide variety of different operating load conditions. As a result, machines typically operate at or near the highest levels of efficiency at certain times, while at other times, they operate at lower efficiency levels.

Battery powered electric vehicles provide a good example of an electric machine operating at a wide range of efficiency levels. During a typical drive cycle, an electrical vehicle will accelerate, cruise, de-accelerate, brake, corner, etc. Within certain rotor speeds and/or torque ranges, the electric machine operates at or near is most efficient operating point, i.e., its "sweet spot." Outside these ranges, the operation of electric machine is less efficient. As driving conditions change, the machine transitions between high and low operating efficiency levels as the rotor speed and/or torque changes. If the electric machine could be made to operate a greater proportion of a drive cycle in high efficiency operating regions, the range of the vehicle for a given battery charge level would be increased. Since the limited range of battery powered electric vehicles is a major commercial impediment to their use, extending the operating range of the vehicle is highly advantageous. A need therefore exists to operate electric machines, such as motors and generators, at higher levels of efficiency.

The present application relates generally to pulsed control of Externally Excited Synchronous Machines (EESM) that can be operated in a continuous or pulsed manner. By pulsed control, the machine is intelligently and intermittently pulsed on and off to both (1) meet operational demands while (2) improving overall efficiency compared to continuous control. More specifically, under selected operating conditions, an electric machine is intermittently pulse-driven at more efficient energy conversion operating levels to deliver the desired average output more efficiently than would be attained by continuous control. Pulsed control results in deliberate modulation of the electric machine torque; however, the modulation is managed in such a manner such that levels of noise or vibration are minimized for the intended application.

For the sake of brevity, the pulsed control of EESMs as provided herein is described in the context of a three-phase electric wound field synchronous motor in a vehicle. This explanation, however, should not be construed as limiting in any regard. On the contrary, the pulse control as described herein can be used for many types of electric wound field synchronous motor machines, meaning both electric motors and generators. In addition, pulsed control of such electric wound field synchronous machines may be used in any application, not just limited to electric vehicles. In particular, pulsed control may be used in systems that require lower acceleration and deceleration rates than vehicle applications, such as electric motors for heating, cooling, and ventilating systems. Pulsed engine control is described in U.S. Patent Publication No. 2019/0288629 which is incorporated herein by reference in their entirety.

Wound Field Synchronous Machines

Wound field synchronous machines are motors or generators that are able to convert electricity to mechanical movement or mechanical movement to electricity without permanent magnets. Wound field synchronous machines may be wound field synchronous motors (WFSM) and wound field synchronous generators (WFSG). Wound field synchronous machines, can also be referred to as Externally Excited Synchronous Machines (EESM). WFSMs may include wound field synchronous rotors, where a field coil (also called field windings) is located in the rotor, and armature phase windings in the stator. In a WFSM, the field coil is powered by a DC power source. In most WFSM, the armature windings are powered by an AC power source. In WFSMs, slip rings may be used to provide electrical contacts between the DC power source and the field coils on the rotor. In some embodiments, an air gap may be used to provide electrical contact to the field coils. A DC motor would place the field coils on the stator and use a commutator connected to the rotor in order to convert DC power to AC power.

Three-Phase Externally Excited Synchronous Machines

In a three-phase EESM, the stator may include a three-coil winding that is excited by a three-phase AC input and the field coils on the rotor that are powered by a DC input. When the three-phase AC input is passed through the three-phase armature windings, a rotating magnetic field (RMF) is generated. The rotational rate of the RMF is known as the synchronous speed (Ns) of the electric machine. The interaction of the field coils of the rotor and the armature windings generate electromagnetic force (EMF) causing the rotor rotation.

Vehicle Motor Efficiency Map

Referring to FIG. 1, an example vehicle motor efficiency map 10 under different load and speed conditions is illustrated. The map 10 plots torque (N*m) along the vertical axis as a function of motor speed (RPM) along the horizontal axis. The maximum steady-state output power is given by curve 12. The example vehicle motor efficiency map is shown to help illustrate an increase in efficiency of an EESM that may be provided by pulsed control of the EESM.

The area under the peak-torque/speed curve 12 is mapped into a plurality of regions, each labeled by an operational efficiency percentage. For the particular motor shown, the following characteristics are evident:

The most efficient or "sweet-spot" region of its operating range is the operating region labeled 14, which is generally in the range of 4,500-6,000 RPM with a torque output in the range of about 40-70 N*m. In region 14, the energy conversion efficiency is on the order of 96%, making it the "sweet spot", where the motor is operating in its most efficient operating range.

As the motor speed increases beyond approximately 6,000+ RPM, the efficiency tends to decrease, regardless of the output torque.

As the output torque increases beyond 70 N*m or falls below 40 N*m, the efficiency percentage tends to decrease from its peak, in some situations rather significantly. For example, when the motor is operating at approximately 2,000 RPM and an output torque of 100 N*m, the efficiency is approximately 86%. When torque output falls below about 30 N*m, regardless of the motor speed, the efficiency drops, approaching zero at zero load.

At any particular motor speed, there will be a corresponding most efficient output torque, which is diagrammatically illustrated by a maximum efficiency curve 16.

The map 10 as illustrated was derived from an electric motor used in a 2010 Toyota Prius which utilizes an internal permanent magnet synchronous motor. It should be understood that this map 10 is merely illustrative and should not be construed as limiting in any regard. A similar map can be generated for just about any electric motor, for example a 3-phase induction motor, regardless of whether used in a vehicle or in some other application.

As can be seen from the map 10, the motor is generally most efficient when operating within the speed and torque ranges of the sweet spot 14. If the operating conditions can be controlled so that the motor operates a greater proportion of time at or near its sweet spot 14, the overall energy conversion efficiency of the motor can be significantly improved.

From a practical point of view, however, many driving situations dictate that the motor operate outside of the speed and torque ranges of the sweet spot 14. In electric vehicles it is common to have no transmission and as such have a fixed ratio of the electric motor rotation rate to the wheel rotation rate. In this case, the motor speed may vary between zero, when the vehicle is stopped, to a relatively high RPM when cruising at highway speeds. The torque requirements may also vary widely based on factors such as whether the vehicle is accelerating or decelerating, going uphill, going downhill, traveling on a level surface, braking, etc.

As can be seen in FIG. 1, at any particular motor speed, there will be a corresponding most efficient output torque which is diagrammatically illustrated by maximum efficiency curve 16. From a conceptual standpoint, when the desired motor torque is below the most efficient output torque for the current motor speed, the overall efficiency of the motor can be improved by pulsing the motor, so as to operate the motor a proportion of time at or near its sweet spot and the remainder of the time at a low or zero torque output level. The average torque thus generated is controlled by controlling the duty cycle of sweet spot operation.

Figure 2:
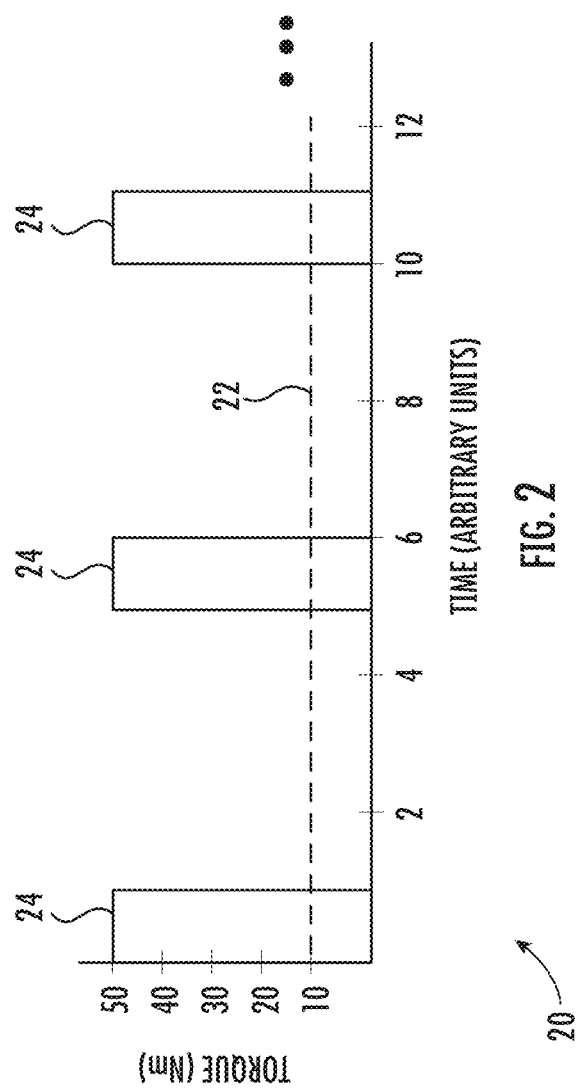
FIG. 2 is a graph illustrating a pulsed torque signal applied to an electric motor.

Referring to FIG. 2, a graph 20 plotting torque on the vertical axis versus time on the horizontal axis is illustrated. During conventional operation, the motor would continuously generate 10 N*m, indicated by dashed line 22, so long as the desired torque remained at this value. With pulsed-control operation, the motor is pulsed with a current pulse signal, as represented by pulses 24, to deliver 50 N*m of torque for 20% of the time. The remaining 80% of the time, the motor is off. The net output of the motor therefore meets the operational demand of an average torque level of 10 N*m. Since the motor operates more efficiently when it is delivering 50 N*m than when it delivers a continuous torque of 10 N*m, the motor's overall efficiency can thus be improved by pulsing the motor using a 20% duty cycle while still meeting the average torque demand. Thus, the pulsed operation provides a higher energy efficiency than the continuous operation.

In the above example, the duty cycle is not necessarily limited to 20%. As long as the desired motor output, does not exceed 50 N*m, the desired motor output can be met by changing the duty cycle. For instance, if the desired motor output changes to 20 N*m, the duty cycle of the motor operating at 50 N*m can be increased to 40%; if the desired motor output changes to 40 N*m, the duty cycle can be increase to 80%; if the desired motor output changes to 5 N*m, the duty cycle can be reduced to 10% and so on. Generally, pulsed motor control can potentially be used advantageously any time that the desired motor torque falls below the maximum efficiency curve 16 of FIG. 1.

On the other hand, when the desired motor torque is at or above the maximum efficiency curve 16, the motor may be operated in a conventional (continuous or non-pulsed) manner to deliver the desired torque. Pulsed operation offers opportunity for efficiency gains when the motor is required to deliver an average torque below the torque corresponding to its maximum operating efficiency point.

It should be noted that torque values and time scale provided in FIG. 2 are merely illustrative and are not intended to be limiting in any manner. In actual motor pulsing embodiments, the pulse duration used may widely vary based on the design needs of any particular system. In generally, however, the scale of the periods for each on/off cycle is expected to be on the order of 10 milliseconds (ms) to 0.10 seconds (i.e., pulsing at a frequency in the range of 10 to 100 Hz). Furthermore, there are a wide variety of different EESMs, and each EESM has its own unique efficiency characteristics. Further, at different motor speeds, a given motor will have a different efficiency curve. The nature of the curve may vary depending on the particular wound field synchronous motor or a particular application. For example, torque output need not be flat topped as depicted in FIG. 2 and/or the torque need not go to zero during the off periods but may be some non-zero value. Regardless of the particular curve used, however, at some proportion of the time the EESM is operating is preferably at or near its highest efficiency region for a given EESM.

Efficiency Improvements for Improved Rate of Rotor Current Rise and Fall

The vast majority of current motor converters are typically designed for continuous operation, not pulsed operation. Such motors generally transition from the unenergized to an energized state relatively infrequently. As a result, little design effort is made in managing the rate of rotor current rise during such transitions. To the extent any design effort is made in managing the transition, it is typically directed to achieving a smooth transition as opposed to a fast transition. The transition from the un-energized to energized states for most motors is therefore often rate limited.

It has been discovered that for an electric motor that regularly transitions from an unenergized motor state to peak efficiency state such as with pulsed operation, even further efficiency improvements can be realized when the transitions occur as fast as possible, e.g., with an improved rate of rotor current rise. With fast transitions, for example from zero torque to the peak efficiency torque, the overall average motor efficiency is improved because the motor spends less time in transition where efficiency is less than the peak. This relationship is depicted in FIG. 3A and FIG. 3B

Figure 3A:
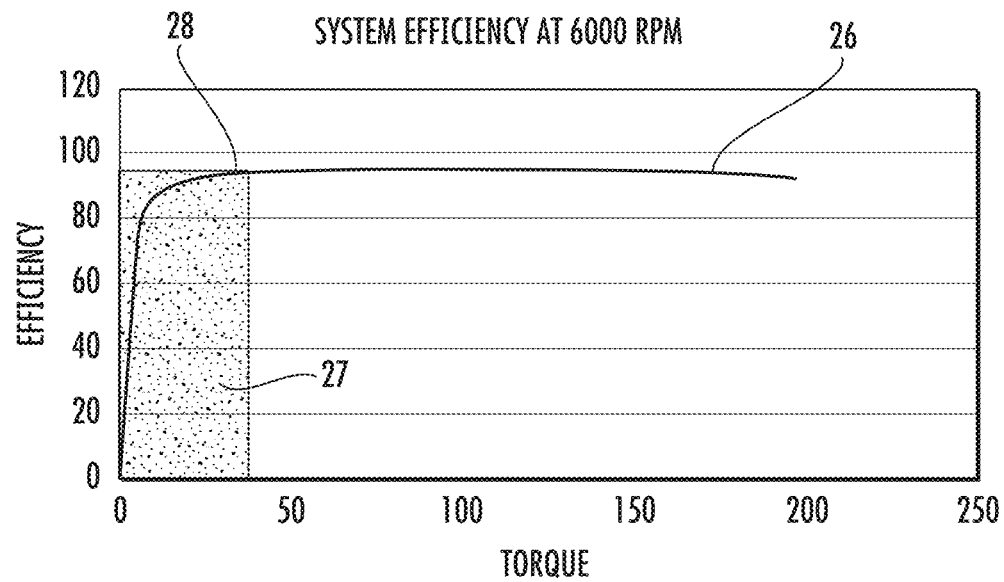
FIG. 3A is a torque versus efficiency map for a motor operating at a fixed speed during a transition from zero to peak efficiency torque.

Referring to FIG. 3A, a torque versus efficiency map for an example electric motor operating at a fixed speed (e.g., 6000 rpms) is illustrated. In the example map, a range of torque outputs from 0.0 Nm to 250 Nm is plotted along the horizontal axis, while the efficiency of the motor from 0.0 percent to 100 percent is plotted along the vertical axis. The curve 26 depicts the transition of the motor from zero to peak efficiency torque. During this transition, as depicted by the shaded region 27, the peak efficiency torque has a much lower efficiency at the peak efficiency torque 28.

Figure 3B:
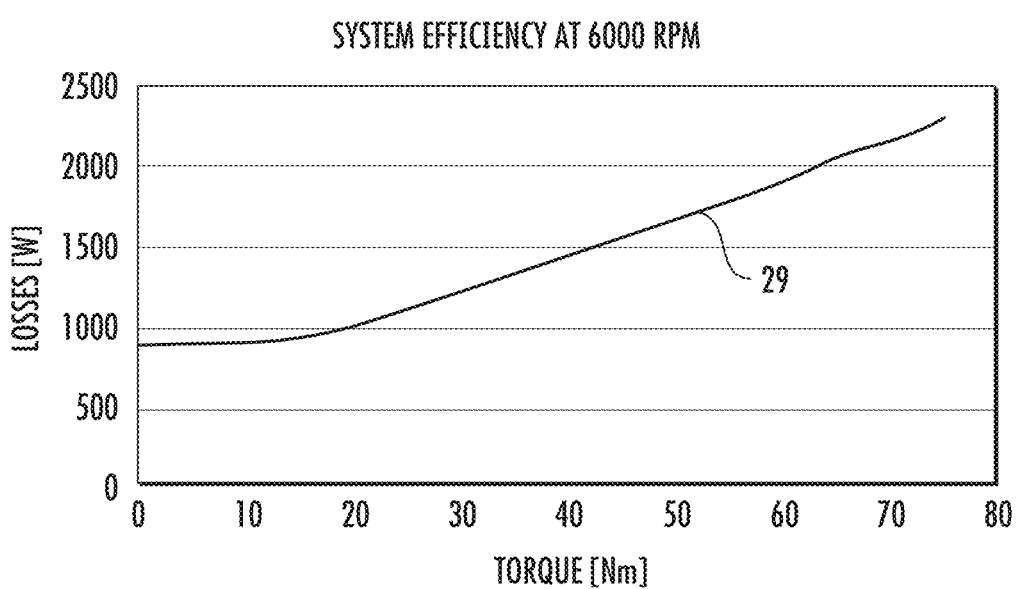
FIG. 3B is a torque versus work lost for an example motor operating at a fixed speed during a transition from zero to peak efficiency torque.

Referring to FIG. 3B, a map is provided illustrating torque versus work lost for an example motor operating at a fixed speed during a transition from zero to peak efficiency torque. In this map, the work losses (W) are plotted along the vertical axis, while the torque output of the motor is plotted along the horizontal axis. As demonstrated by the curve 29, the work losses of the motor increase as the torque output increases during the transition from zero to peak efficiency torque. Therefore, the faster that transition time from zero to peak efficiency torque, the less work is performed, and the less energy is consumed by the electric motor.

By substituting time in place of torque along the horizontal axis and then integrating the area under the curve 29, the energy consumed by the electric motor can be calculated for a given transition time. For instance, with an example motor, 7234.5 Joules of energy was used with a transition time of 0.5 seconds, while only 723.4 Joules of energy were used a transition time of 0.05 second. This comparison demonstrates that the faster the transition time from zero to peak efficiency torque, the lower the energy consumed in losses. It should be noted that with this example, it is assumed that no acceleration of the load has taken place, so no energy has been added to the load inertia. Just as efficiency is increased by decreasing rise time, efficiency is increased by decreasing fall time.

For different motors, the transition of the motor from zero to peak efficiency torque, the peak efficiency torque and the work losses will vary. The maps of FIG. 3A and FIG. 3B should therefore be viewed as merely example and should not be construed as limiting in any regard.

Power Converter

Power inverters are known devices that are used with electric motors for converting a DC power supply, such as that produced by a battery or capacitor, into multi-phase AC input power, e.g., three-phase AC input power, applied to motor stator windings. In response, the stator windings generate the RMF as described above.

Figure 4:
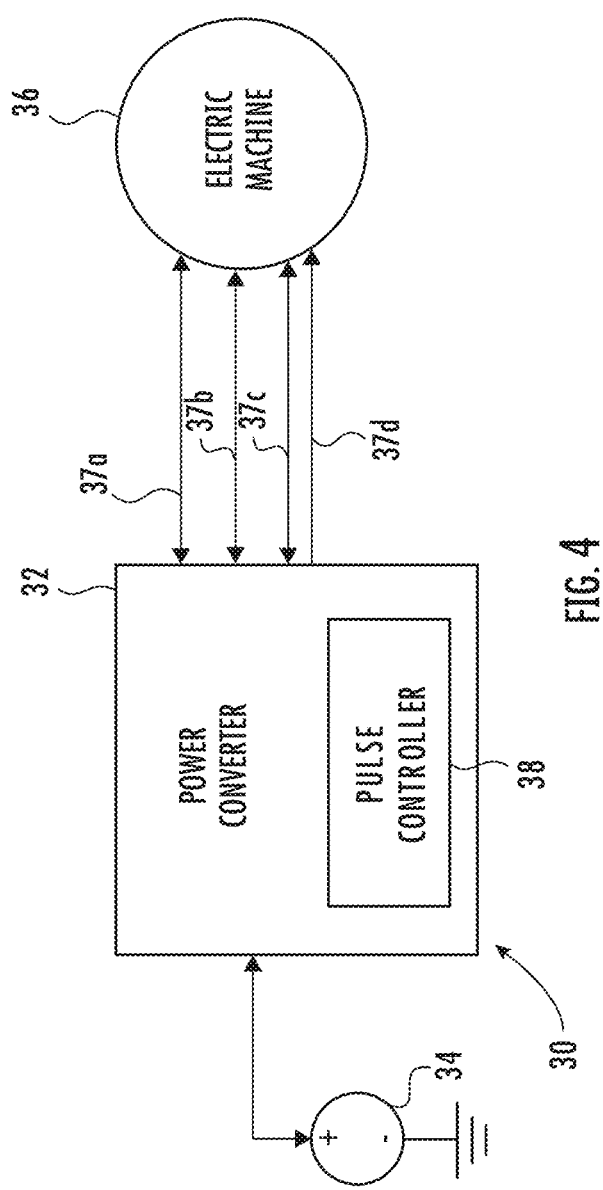
FIG. 4 illustrates a pulsed controlled electric machine in accordance with a non-exclusive embodiment.

Referring to FIG. 4, a diagram of a power controller 30 for pulsed operation of an electric machine is illustrated. The power controller 30 includes a power converter 32, a DC power supply 34, and an electric machine 36. In this non-exclusive embodiment, the power converter 32 comprises a pulse controller 38. The power converter 32 may be operated as a power inverter or power rectifier depending on the direction of energy flow through the system. When the electric machine is operated as a motor, the power converter 32 is responsible for generating three-phased AC power from the DC power supply 34 to drive the electric machine 36. The three-phased input power, denoted as phase A 37a, phase B 37b, and phase C 37c, is applied to the windings of the stator of the electric machine 36 for generating the RMF as described above. The lines depicting the various phases, 37a, 37b, and 37c are depicted with arrows on both ends indicating that current can flow both from the power converter 32 to the electric machine 36 when the machine is used as a motor and that current can flow from the electric machine 36 to the power converter 32 when the machine is used as a generator. When the electric machine is operating as a generator, the power converter 32 operates as a power rectifier and the AC power coming from the electric machine 36 is converted to DC power being stored in the DC power supply. The line depicting the field current, 37d carries a DC field current that typically is unidirectional for both the motor and generator operating modes.

The pulse controller 38 is responsible for selectively pulsing the three-phased input power. During conventional (i.e., continuous) operation, the three-phased and field coil input power is continuous or not pulsed. On the other hand, during pulsed operation, the three-phased and field coil input power is pulsed. Pulsed operation may be implemented, in non-exclusive embodiments, using any of the approaches described herein, such as but not limited to the approaches described below.

Referring to FIG. 5A-5F, plots are provided for illustrating the difference between continuous and pulsed three-phased and field current input power provided to the electric machine 36. In each plot, phase and field currents are plotted on the vertical axis and time is plotted along the horizontal axis.

Figure 5A:
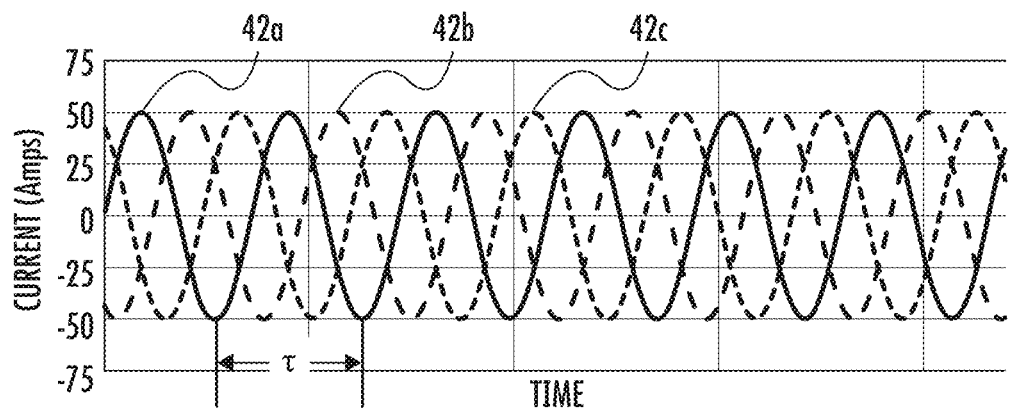
FIG. 5A is a diagrammatic representation of a continuous three-phase AC waveform having a peak value of 50 Amperes for armature windings.
Figure 5B:
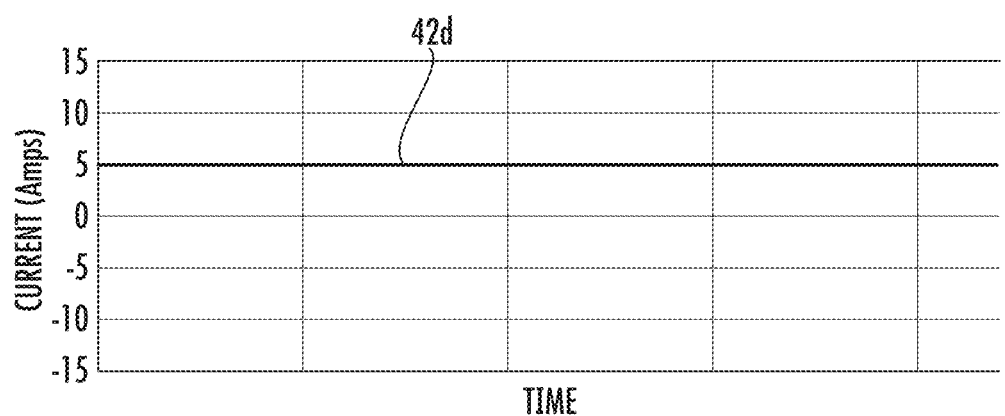
FIG. 5B is a diagrammatic representation of a continuous DC signal at 5 Amperes for field windings.

FIG. 5A illustrates conventional sinusoidal three-phased input current 42a, 42b, and 42c delivered to the armature windings of the electric machine 36. Phase B, denoted by curve 42b lags phase A, denoted by 42a by 120 degrees. Phase C, denoted by curve 42c, lags phase B by 120 degrees. The sine wave period is T. The three-phased input current 42a, 42b, and 42c is continuous (not pulsed) and has a designated maximum amplitude of approximately 50 amps. FIG. 5B illustrates the conventional DC field current 42d delivered to the field coils. The field current is continuous (not pulsed) and has an amplitude of 5 amps. It should be appreciated that 50 amps (for the phased current delivered to the armature windings) and 5 amps (for the field current delivered to the field coils) are only a representative maximum current, and the maximum current may have any value.

Figure 5C:
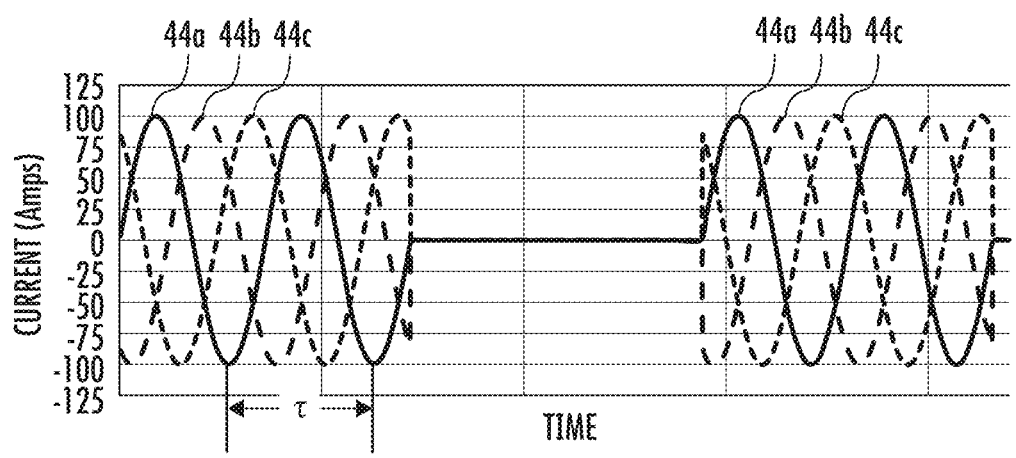
FIGS. 5C and 5E are pulsed waveforms having a 50% duty cycle that provide the same power output as the continuous waveform of FIG. 5A.
Figure 5D:
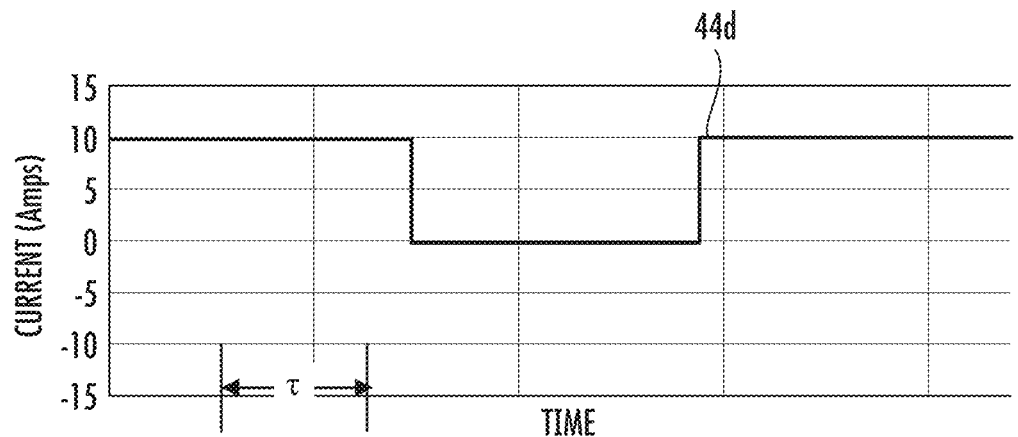
FIGS. 5D and 5F are pulsed DC signals having a 50% duty cycle that provide the same power output as the continuous DC signal of FIG. 5B.

FIG. 5C and FIG. 5D illustrate an example pulsed three-phased current waveforms 44a, 44b, and 44c, shown in FIG. 5C, with a pulsed DC field current 44d, shown in FIG. 5D that has a 50% duty cycle and peak amplitude of approximately 100 amps for the three-phased waveforms 44a, 44b, and 44c and approximately 10 amps for the field current 44d. As in FIG. 5A the period of the base sine wave is ti, however, now the sine wave is modulated on and off. The delivered currents in FIG. 5C and FIG. 5D deliver the same average torque as the continuously applied three-phased input current of FIG. 5A and FIG. 5B (assuming torque is proportional to currents, which is often the case). In FIG. 5C and FIG. 5D, the current pulses 44a-d are interleaved with "off" periods of equal length. The length of each on and off period is 2-c. In this example, the duty cycle is 50%. The frequency of the pulsed modulation may vary based on the type of electrical machine used, noise and vibration considerations, current operating rotor speed, and other factors.

This example in FIG. 5C and FIG. 5D illustrates an application in which the "on" motor drive pulses are evenly spaced while the motor is operated at a steady state desired output level. Such an approach works well in many circumstances but is not a requirement. The duty cycle need not be 50% but can be adjusted to match the desired average output torque. In FIG. 5C and FIG. 5D the phase of the on/off pulses is synchronized with the applied power; however, the phase of the on/off pulses need not be synchronized with the phase of the applied power in some embodiments. Thus, the relative sizes and/or timing of the motor drive pulses can be varied as long as they average out to deliver the desired average torque.

This example shows how both the armature winding AC current and the DC field coil current may be pulsed. The pulsing is designed to allow the EESM to operate at an efficient torque level, while reducing the amount of power needed to provide a desired torque level.

Figure 5E:
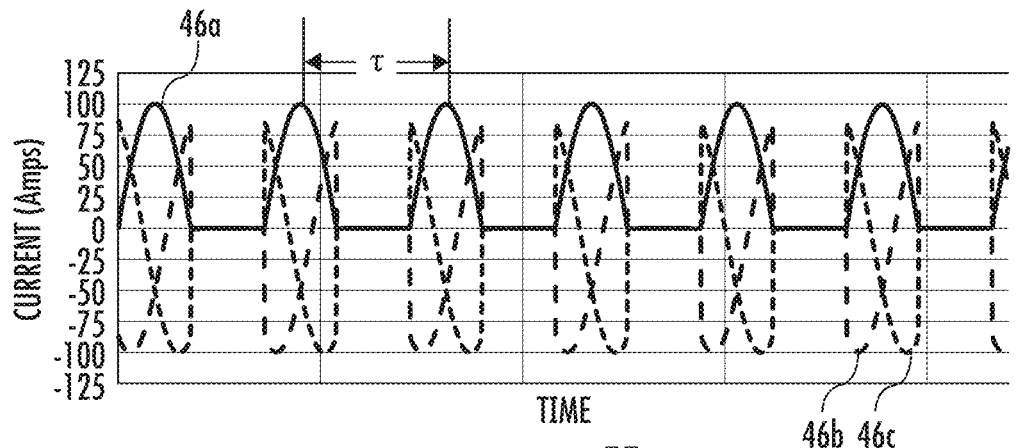
Figure 5F:
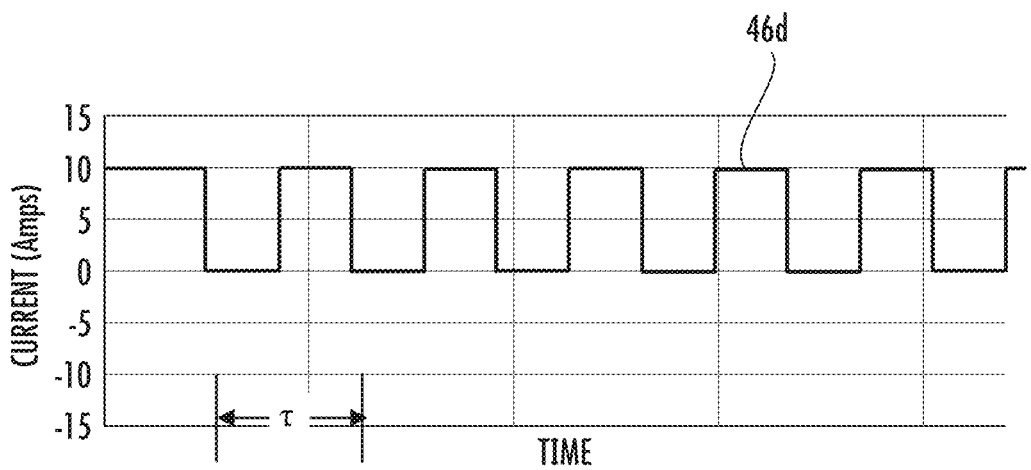

FIG. 5E and FIG. 5F illustrate another example of pulsed three-phased current waveforms 46a, 46b, and 46c, shown in FIG. 5E, with a pulsed DC field current 46d, shown in FIG. 5F that has a 50% duty cycle and peak amplitude of approximately 100 amps for the three-phased waveforms 46a, 46b, and 46c and approximately 10 amps for the field current 46d. As in FIG. 5A the period of the base sine wave is ti, however, now the sine wave is modulated on and off. The delivered current in FIG. 5E and FIG. 5F delivers the same average torque as the continuously applied three-phased input current of FIG. 5A and FIG. 5B (assuming torque is proportional to currents, which is often the case). In FIG. 5E and FIG. 5F, the current pulses 46a-d are interleaved with "off" periods of equal length. The length of each on and off period is τ/2. In this example, the duty cycle is 50%. The frequency of the pulsed modulation may vary based on the type of electrical machine used, noise and vibration considerations, current operating rotor speed, and other factors.

Power Converter Circuit

The inherent inductance of the motor can transitorily delay/slow the voltage/power steps between the on and off motor states. During continuous (non-pulsed) operation, these transitory effects tend to have a relatively minimal impact on overall motor operation. However, when rapid pulsing is used as contemplated herein, the transitory effects can have a larger net impact, and therefore, there is an incentive to reduce the leading and falling edge pulse transition times. This is particularly important for the field current that can take significantly longer to build magnetic flux in the rotor than it takes for the stator to build stator flux when a current is applied to the armature windings.

Figure 6A:
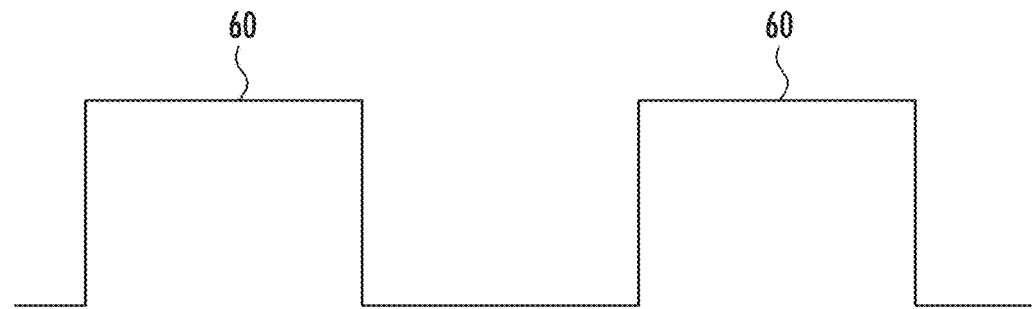
FIGS. 6A-6C are signal diagrams illustrating benefits of a non-exclusive embodiment.

As previously noted, the goal of pulsed motor control is to operate the electric machine 36 at substantially its most efficient level for the current machine speed during "on" periods and to cut-off power (provide zero or negligible power) during the "off" periods. For example, the power supplied during the off periods may be less than 10%, 5%, 1%, 0.5%, or 0.1% of the power supplied during the "on" period. The operating point while operating during the "on" period may have an efficiency within 5%, 2%, or 1% of a maximum operating efficiency point of the motor at the current motor speed. The transitions thru the low efficiency operating region between the "off" and "on" periods should be as fast as possible to maximize efficiency. Thus, the power transitions between the machine power "on" and "off" states ideally have a leading edge that transitions vertically straight up and a following edge that vertically transitions straight down. Such "perfect" pulses 60 are diagrammatically illustrated in FIG. 6A, which illustrates the ideal motor drive current versus time for pulsed control having a duty cycle of 50%. In this figure, the current pulse represents the field winding current. While the current pulse is shown as flat topped, this will not necessarily be the case.

In the real-world, a number of practical limitations make generation of such perfect pulses difficult to achieve. For instance, inductive aspects of both the electric machine 36 and the power converter 32 circuitry slow down the current rise and fall times. The actual response of a particular machine will vary with the electrical characteristics of the electric machine 36, the rotational speed of the electric machine and the available bus voltages. In general, the actual rise and fall of pulses occur more gradually, meaning the transitions occur over time. The nature of the rise and fall in the real-world is diagrammatically illustrated in FIG. 6B. As seen therein, there is a ramp-up period (rise time) 62 required for the current to actually rise from zero to the desired "on" power level and a ramp-down period (fall time) 64 required for the current to actually fall from the "on" power level down to zero.

During the power ramp-up and ramp-down periods, the wound field synchronous machine 36 continues to consume or generate power. However, the wound field synchronous machine operates less efficiently during these transition periods. In general, the wound field synchronous machine efficiency will drop as the operating current drops from its maximum efficiency condition (curve 16 FIG. 1) towards zero, with the energy conversion efficiency getting noticeably worse as the current level approaches zero. Thus, the pulse distortion represented by the current ramp-up and ramp-down periods detract from efficiency gains resulting from pulsed operation. In general, the smaller the ratio of the rise/fall times to the pulse length, the less the transitory switching effects impact the machine's energy conversion efficiency during pulsing.

Figure 6B:
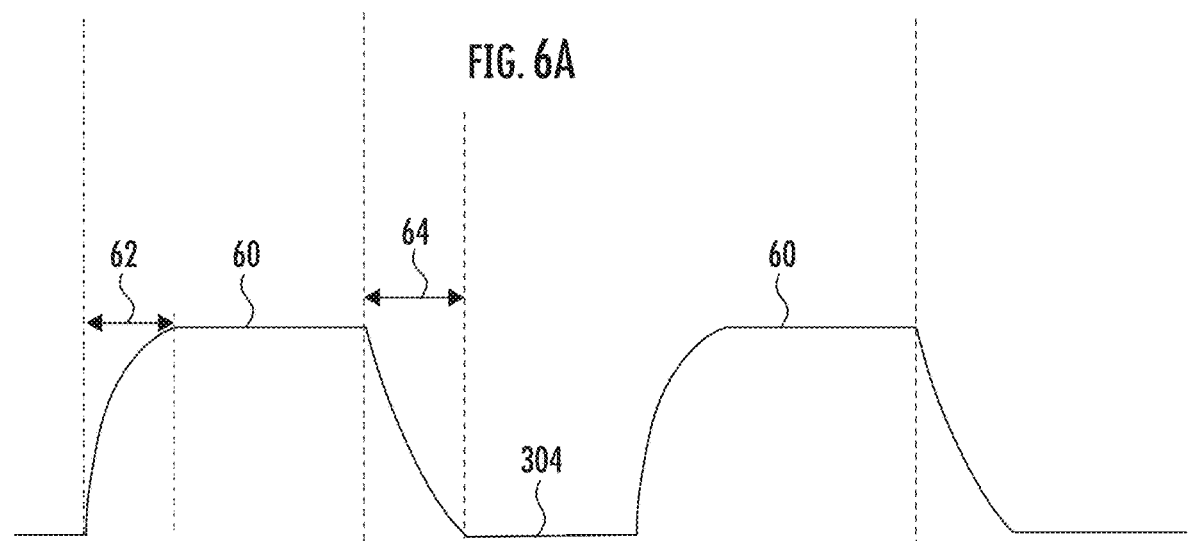
Figure 6C:
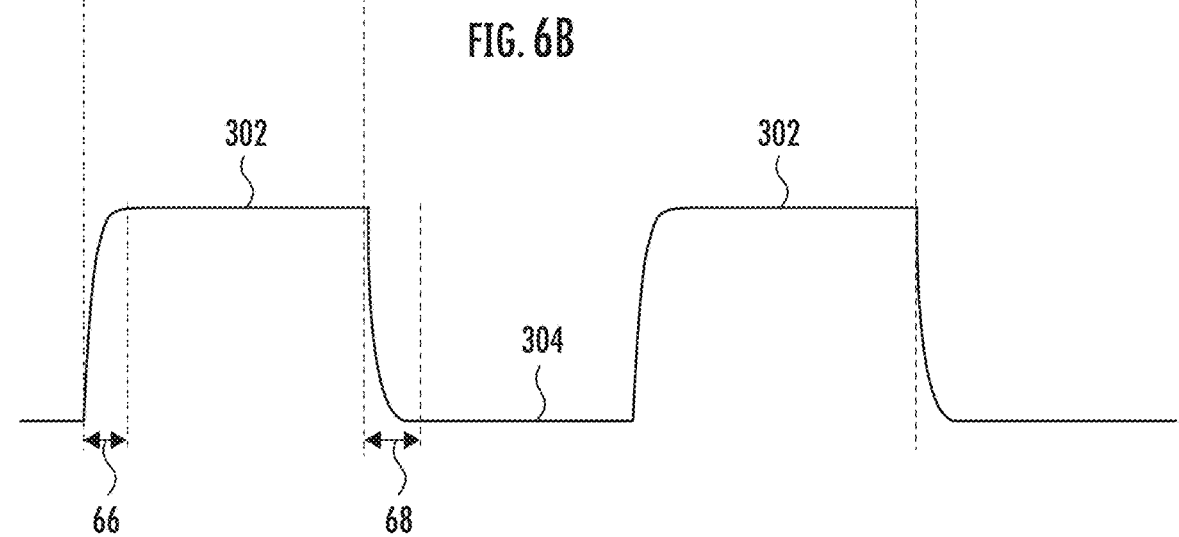

It should be appreciated that the transitory effects shown in FIG. 6B are illustrative in nature and do not necessarily reflect actual rise/fall times associated with operation of any particular wound field synchronous machine. The relative scale of the rise time to the pulse length ratio can vary widely based on the characteristics of the wound field synchronous machine used (which primarily dictates the rise and fall times), the frequency of the pulsing (which is primarily dictated by the control scheme used) and the pulse width (which is dictated by the control scheme and machine load). The voltage available to power the wound field synchronous electric machine and machine rotation speed will also impact the pulse rise and fall times. If the pulsing is slow compared to the wound field synchronous machine response, the rise/fall times may be a small fraction of the pulse width and the transitory switching effects may have a minimal impact on machine performance. Conversely, if the pulsing is very rapid and/or the wound field synchronous machine response is low, the rise/fall times may be a significant fraction of the pulse width and can even exceed the pulse width in some situations. If not managed carefully, the transitory efficiency losses associated with switching can significantly reduce or even eliminate any theoretical gains that can be attained by pulsed operation. Thus, it is important to consider the transitory switching effects associated with pulsed operation when determining the pulsing frequency and control schemes that are appropriate for any particular application.

As noted above, for continuous control of an electric machine there is not a need to improve a rate of torque buildup in the electric machine. In contrast, for pulsed control of an electric machine, e.g., DMD, there is a need to improve a rate of torque buildup in the electric machine.

One method to improve a rate of torque buildup in the electric machine is to improve a rate of torque buildup is to maintain the magnetic flux in the rotor by continuously providing current to the rotor and modulating or pulsing the stator current. However, providing continuous current to the rotor decreases the efficiency of the electric machine and in some instances may cause pulsed control to be less efficient than continuous control. Thus, there is a need to improve the buildup of the magnetizing flux of the rotor when rotor current is pulsed on and off.

Analysis of how magnetizing flux of an EESM creates torque in the EESM has been shown to provide a method for increasing a rate of torque buildup in the EESM. Torque of an EESM can be represented by following torque equation:

$$T = 3 \times \frac{polepairs}{4} * (\varphi_d i_q - \varphi_q i_d) + k_r i_r i_q$$

with $k_r$ being a constant. From the torque equation, the magnetizing flux can be derived from the rotor directly as $k_r i_r$, or can be derived from the stator $\varphi_d = L_d i_d$. However, producing magnetizing flux through the stator $\varphi_d$ does not produce the same torque as efficiently as producing the magnetizing flux directly from energizing the rotor, e.g., $k_r i_r$. As such, during normal continuous torque operation the stator direct current ($i_d$) is controlled to zero such that the magnetizing flux is generated entirely from the current provided to the rotor.

As detailed below, exciting both the rotor and the stator at the same time may be used to quickly generate the magnetizing flux and thus, to improve the rate of torque build up in the electric machine. For example, utilizing a first path of creating magnetic flux by providing the rotor with current, $i_{re}$, and utilizing a second path of creating magnetic flux by providing the stator with a biasing current, $i_d$, may improve the rise of magnetic flux in the electric machine and thus improve a rate of torque rise in the electric machine. Improving the rate of torque rise in the electric machine may decrease the transition time between an ON and an OFF state of the electric machine.

Figure 7:
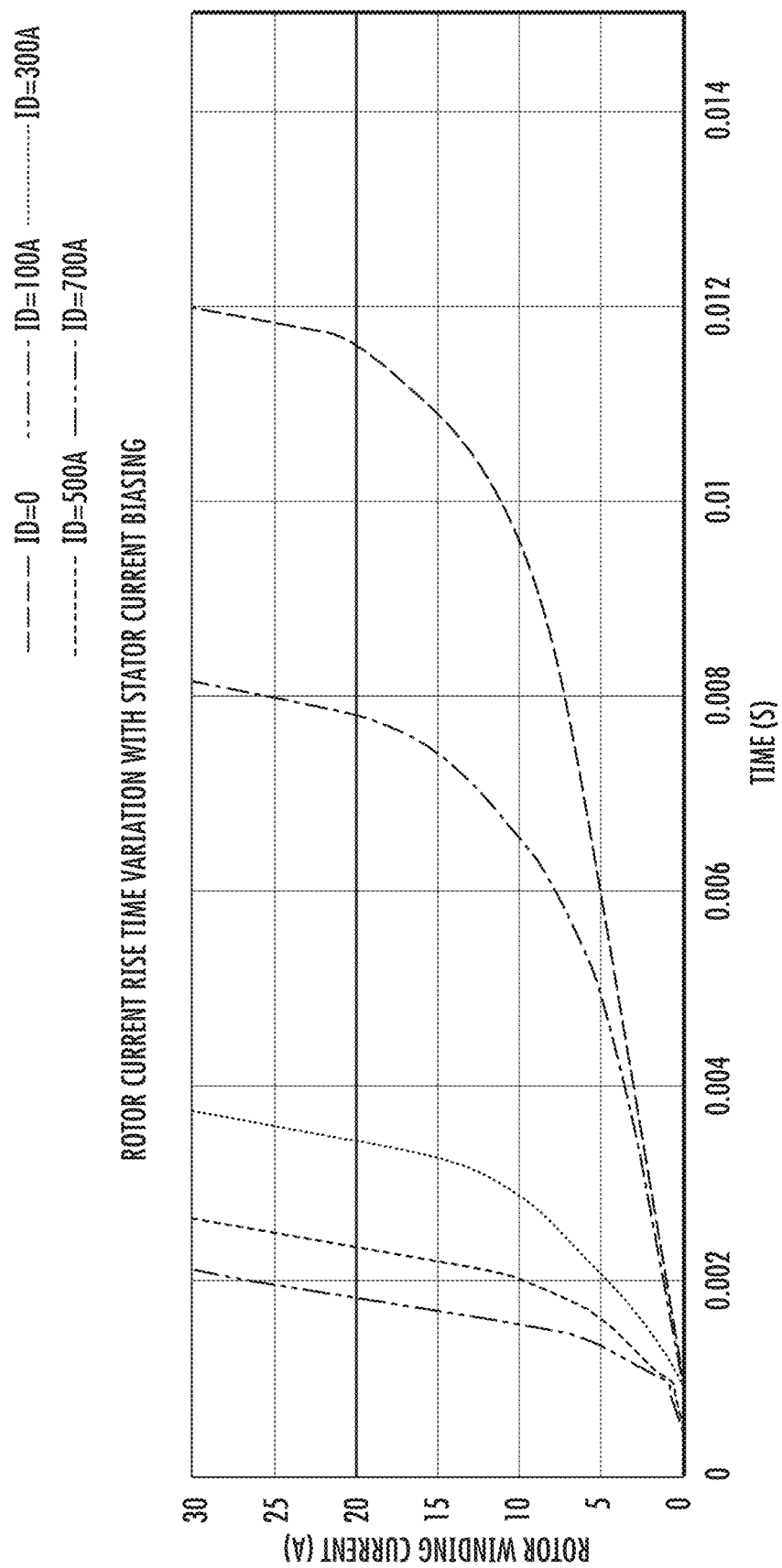
FIG. 7 is a graph of a model provided in accordance with embodiments of the present disclosure illustrating Current Rise Time for a Rotor various with Stator Current Biasing

With reference to FIG. 7, a model of rotor current versus time is illustrated for different stator bias currents in accordance with embodiments of the present disclosure. The rotor current is representative of a torque being generated by the electric machine. As shown in the model, the stator biasing current is provided at 1 ms. For the model shown, a maximum torque of the electric machine is provided at 20 Amps of rotor current with a normal pulsed torque provided in a range of 7-10 Amps of rotor current.

As shown in the model, exciting only the rotor as a single path, e.g., the stator biasing current being zero ($i_d$=0), the electric machine takes 8.5 ms to deliver 10 Amps and 10 ms to deliver Amps of rotor current. The improved rate of rise from exciting the second path of the stator by providing direct current to the stator is shown. For example, providing a stator biasing current of 100 Amps of direct current reduces the time for the electric machine to deliver 10 Amps to 5.5 ms and the time to deliver 20 Amps to 6.75 ms. This is further shown that by providing a stator biasing current of 700 Amps of direct current reduces the time for the electric machine to deliver 10 Amps to 0.5 ms and the time to deliver 20 Amps to 0.75 ms.

It has been found that the stator biasing current can be provided to an EESM at the same time as the rotor current without modification to an existing EESM. For example, the power controller 30 can be configured to excite both the first path of the rotor and the second path of the stator at the same time during a transition from an OFF state to an ON state of the electric machine such that the stator biasing current is provided to the stator to improve the rise of magnetic flux in the rotor. In embodiments, the power controller 30 may provide the full available voltage to the stator and the rotor and adjust the phase angle of the applied stator voltage by saturating the stator current controllers such that each path is excited at the same time to improve the maximum rate of rise of the magnetic flux and building up a motive flux of the electric machine. The power controller 30 may exit this voltage saturation to control the magnitude and the phase of the stator biasing current and the magnitude of the rotor current to achieve the demanded pulse torque in the shortest time. The power controller 30 may control the voltage saturation such that the magnetic flux is built up in an efficient path for the application of pulsed control, e.g., DMD. In some embodiments, symmetry of control of the stator current in parallel with the rotor current can be used to reduce the time required to extract the magnetizing field such that pulses of the electric machine can be turned off quickly and efficiently.

Once the magnetic flux is built up in the rotor such that the electric machine is generating the desired torque, e.g., the pulsed torque, the power controller 30 terminates the stator biasing current and the rotor current is maintained until the end of the pulse. In some embodiments, when the electric machine is transitioned from the ON state to the OFF state or the OFF state to the ON state, the power controller 30 may smooth the transition between states to reduce a sharpness of the transition. This transition may improve noise, vibration, or harshness characteristics of the electric machine.

The improvement in the rise of rotor current, detailed above, has been verified for an electric machine which achieves a magnetic flux with 8 Amps of rotor current. When rotor current was applied with no stator biasing current, the electric machine took 15.4 ms to achieve a rotor current of 8 Amps. In contrast, when rotor current was applied with a stator biasing current of 300 Amps, the electric machine achieved a rotor current of 8 Amps in 1 ms.

Figure 8:
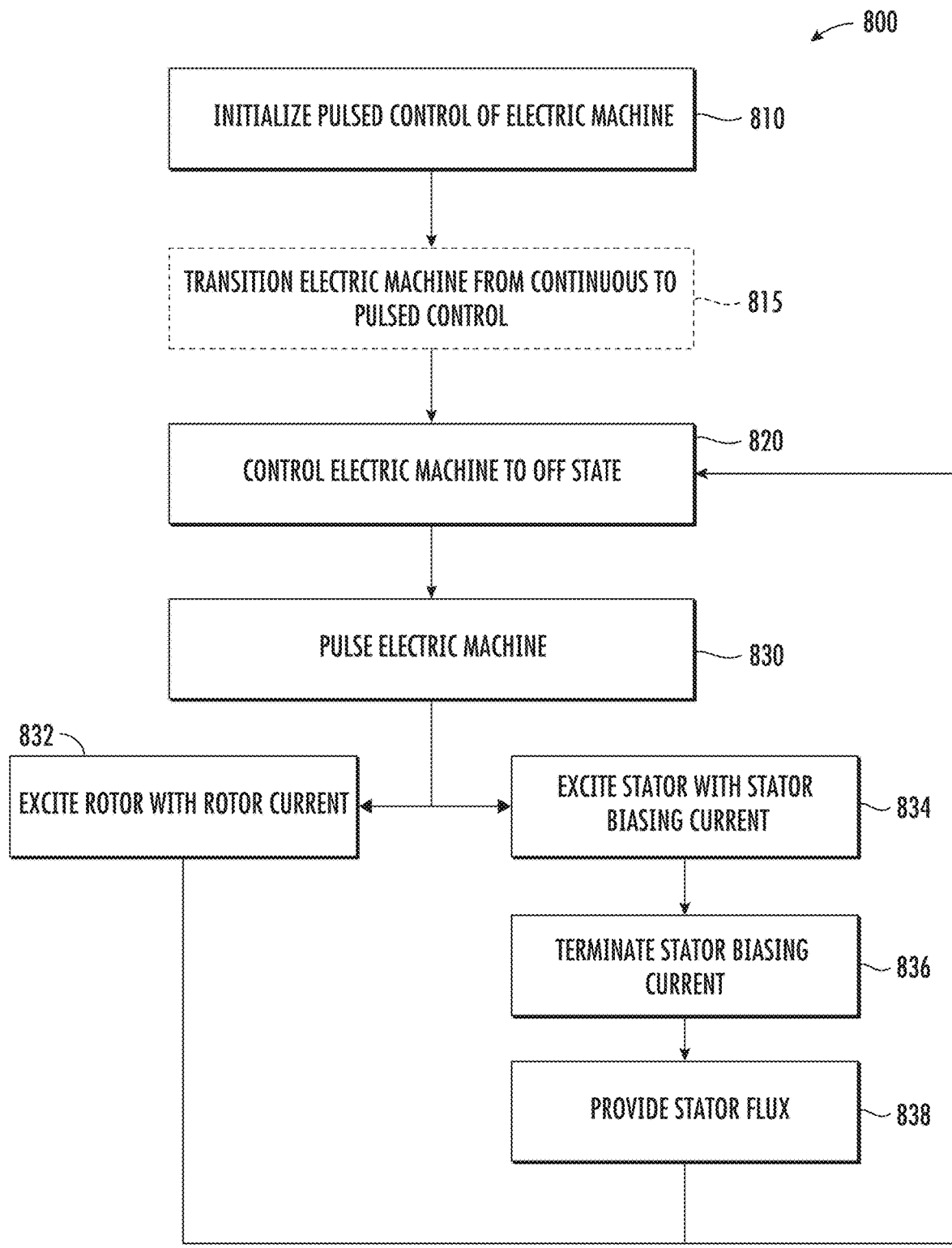
FIG. 8 is a flow chart of a method of improving a rate of rise of torque in an electric machine provided in accordance with the present disclosure.

Referring now to FIG. 8, a method of improving a rate of rise of torque in an electric machine is provided in accordance with embodiments of the present disclosure and is referred to generally as method 800. The method 800 is described with reference to the example electric machine 36 and power controller 30 of FIG. 4. The example electric machine 36 may be an EESM. As detailed below, the method 800 is used during pulsed control of an electric machine, e.g., an EESM, to increase a rate of rise of torque of each pulse of the electric machine. However, the method 800 may be used to transition between an initial off state of the electric machine to a continuous ON torque of the electric machine.

As detailed above, when it is determined that the electric machine 36 will be more efficient when operated in pulsed control versus continuous control, the power controller 30 may initialize pulsed control of the electric machine 36 (Step 810). The determination to enter pulsed control may be made within the power controller 30 or another controller that is in signal communication with the power controller 30. In pulsed control, the power controller 30 may determine a pulsed torque and duty cycle of the electric machine 36 or may be provided with the pulsed torque and the duty cycle by another controller that is in signal communication with the power controller 30.

When the power controller 30 enters pulsed control of the electric machine 36, the power controller 30 may transition from continuous control to pulsed control (Step 815). To transition the electric machine 36 from continuous control to pulsed control, the power controller 30 terminates delivery of rotor current, in the form of direct current to the rotor, and stator flux, in the form of multi-phase AC current to the stator, such that the electric machine 36 is in an OFF state (Step 820).

With the electric machine in the OFF state, the power controller 30 pulses the electric machine 36 (Step 830). To pulse the electric machine 36, the power controller 30 excites the rotor by providing direct current to the rotor via the field line or path 37d to the rotor of the electric machine 36 (Step 832). While exciting the rotor, the power controller 30 also excites the stator with stator biasing current as direct current via the phase lines 37a, 37b, and 37c (Step 834). The power controller 30 may provide the stator biasing current by saturating each of the phase lines 37a, 37b, and 37C. As detailed above, by exciting both the rotor and the stator at the same time, increases a rise of magnetic flux of the electric machine 36. When the electric machine 36 reaches the magnetic flux for the pulse torque, the power controller 30 terminates the stator biasing current (Step 836) and provides a stator flux to the stator in the form of multi-phase alternating current (Step 838). The power controller 30 may terminate or transition from the stator biasing current to the stator flux by controlling a magnitude and phase of the current being provided to each of the phase lines 37a, 37b, and 37c such that the electric machine 36 provides the pulse torque. When the pulse is completed, the power controller 30 controls the electric machine 36 back to the OFF state (Step 820) and repeats the pulsing of the electric machine (Step 830) until the electric machine 36 is converted back to continuous control or the electric machine 36 is controlled to an extended OFF state. During pulsing of the electric machine 36, each pulse (Step 830) may be of a different magnitude and/or duty cycle such that the electric machine 36 provides a desired torque. In some embodiments, controlling the electric machine 36 to an OFF state, either from a continuous control mode or after a pulse, may include using a stator biasing current to reduce the time for the magnetizing flux of the rotor to reach zero. For example, the power controller 30 may modify the magnitude and/or the phase of the stator flux to a stator biasing current to reduce the time for the magnetizing flux of the rotor to reach zero. Reducing the time for the magnetizing flux of the rotor to reach zero may improve a ramp down of the torque in the electric machine 36.

The method 800 detailed above, may be used without modification to the electric machine 36 that was constructed or configured to for operation in a continuous control mode, e.g., the EESM. In some embodiments, the method 800 detailed above may be combined with a modified electric machine. For example, the number of turns of the rotor may be modified to increase the rate of rise of torque of an EESM in combination with the method detailed above. For additional information on modifying the number of turns of the rotor to increase the rate of rise of torque of an EESM, reference may be made to U.S. Provisional Patent Application No. 63/322,376, filed Mar. 22, 2022, entitled "DELAY REDUCTION FOR PULSED WOUND FIELD SYNCHRONOUS MACHINES," the entire contents of which are hereby incorporated by reference.

Figure 9:
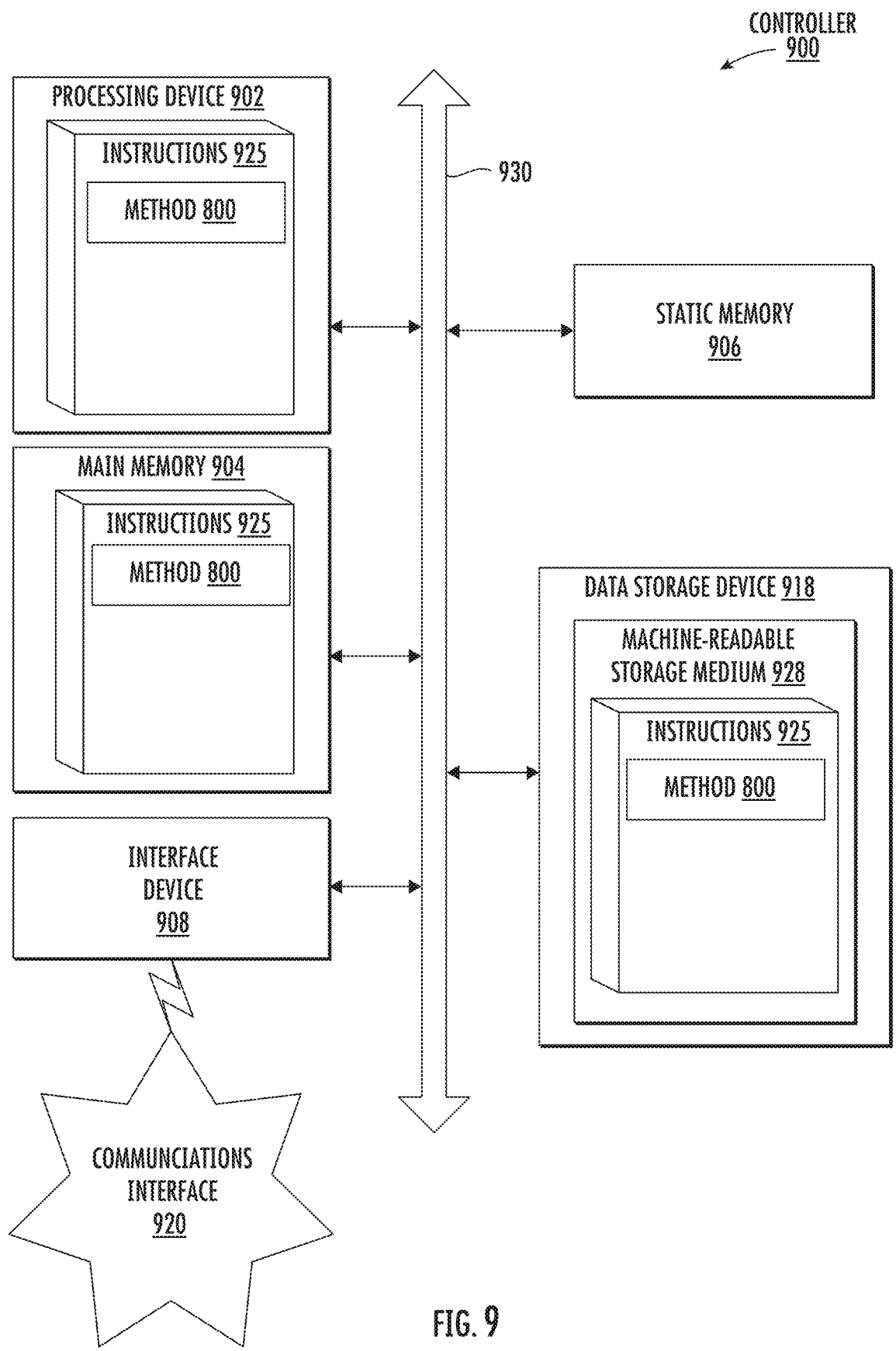
FIG. 9 is a block diagram of an example controller that may perform one or more of the operations described herein.

FIG. 9 is a block diagram of an example controller 900 that may perform one or more of the operations described herein, in accordance with some embodiments. For example, the controller 900 may be used as the power controller 30 or the pulse controller 32 detailed above. The controller 900 may be in signal communication with other computing devices or controllers by being integrated therewithin or connected via a LAN, an intranet, an extranet, and/or the Internet. In some embodiments, while only a single controller is illustrated, the term "controller" may be taken to include any collection of controllers that individually or jointly execute a set (or multiple sets) of instructions to perform the methods discussed herein.

The example controller 900 may include a processing device (e.g., a general-purpose processor, a PLD, etc.) 902, a main memory 904 (e.g., synchronous dynamic random access memory (DRAM), read-only memory (ROM)), a static memory 906 (e.g., flash memory and a data storage device 918), which may communicate with each other via a bus 930.

Processing device 902 may be provided by one or more general-purpose processing devices such as a microprocessor, central processing unit, or the like. In an illustrative example, processing device 902 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may comprise one or more special-purpose processing devices such as an application specific integrated circuit (ASIC), a field programmable gate array (FPGA), a digital signal processor (DSP), network processor, or the like. The processing device 902 may be configured to execute the operations described herein, in accordance with one or more aspects of the present disclosure, for performing the operations and steps discussed herein.

Computing device 900 may include a network interface device 908 which may communicate with a communication network 920. The computing device 900 may include a video display unit (e.g., a liquid crystal display (LCD) or a cathode ray tube (CRT)), an alphanumeric input device (e.g., a keyboard), a cursor control device (e.g., a mouse) and an acoustic signal generation device (e.g., a speaker). In one embodiment, a video display unit, alphanumeric input device, and cursor control device may be combined into a single component or device (e.g., an LCD touch screen).

Data storage device 918 may include a computer-readable storage medium 928 on which may be stored one or more sets of instructions 925 that may include instructions for one or more components (e.g., the electric machine 36) for carrying out the operations described herein, in accordance with one or more aspects of the present disclosure. Instructions 925 may reside, completely or at least partially, within main memory 904 and/or within processing device 902 during execution thereof by computing device 900, main memory 904 and processing device 902 constituting computer-readable media. The instructions 925 may be transmitted or received over a communication interface 920 via interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" may be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Examples described herein may relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an" and "the" are intended to include the plural forms as well, unless the context clearly indicates otherwise. The terms "comprises," "comprising", "includes", and/or "including", when used herein, may specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

In some embodiments, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in a manner that is capable of performing the task(s) at issue. "Configured to" may include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or an unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A method of controlling an electric machine having a separately excitable rotor and stator, the method comprising:
    energizing the electric machine comprising:
        exciting the rotor with direct current and the stator with a stator biasing current at the same time to generate magnetic flux in the rotor via two separate paths;
        terminating the stator biasing current when a desired magnetic flux is generated in the rotor; and
        providing a stator flux to the stator such that the electric machine provides torque;
    controlling the electric machine to an OFF state by terminating the direct current to the rotor and the stator flux.

2. The method of claim 1, wherein the desired magnetic flux is generated in the rotor when the rotor current reaches 8 Amps.

3. The method of claim 2, wherein exciting the rotor with the stator biasing current includes the stator biasing current being at least 300 Amps.

4. The method of claim 3, wherein the rotor current reaches 8 amps in 1 ms.

5. The method of claim 1, wherein providing the stator flux occurs in response to the desired magnetic flux is generated in the rotor.

6. The method of claim 1, wherein energizing the electric machine generates a pulse torque.

7. The method of claim 1, wherein exciting the rotor with direct current and the stator with the stator biasing current at the same time is configured to improve a rate of rise of magnetic flux in the rotor compared to exciting the rotor alone.

8. The method of claim 1, wherein exciting the stator with the stator biasing current includes exciting the stator with direct current.

9. The method of claim 1, wherein terminating the stator biasing current includes controlling a magnitude or phase of current being provided as the stator biasing current to provide the stator flux.

10. The method of claim 1, wherein energizing the electric machine includes the electric machine being an Externally Excited Synchronous Machine (EESM) configured to operate in a continuous control mode.

11. The method of claim 10, wherein energizing the electric machine includes pulsing the EESM which is unmodified for operating in a pulsed control mode.

12. The method of claim 1, wherein terminating the direct current to the rotor and the stator flux includes transitioning the stator flux to a stator biasing current before terminating the direct current to the rotor to reduce the time for the magnetic flux of the rotor to reach zero.

13. The method of claim 1, wherein exciting the rotor with direct current and the stator with the stator biasing current at the same time generates a desired magnetic flux in the 1 ms.

14. A controller for controlling an electric machine having a separately excitable rotor and stator, the controller comprising:
   a memory; and
   a processing device, operatively coupled to the memory, to:
   excite the rotor with direct current and the stator with a stator biasing current at the same time to generate magnetic flux in the rotor via two separate paths;
   provide a stator flux to the stator such that the electric machine provides torque;
   terminate the stator biasing current when a desired magnetic flux is generated in the rotor; and
   control the electric machine to an OFF state by terminating the direct current to the rotor and the stator flux.

15. The controller of claim 14, wherein providing the stator flux to the stator causes the electric machine to provide a pulse of torque.

16. A non-transitory computer-readable medium storing instructions that, when executed by a processing device, cause the processing device to control an electric machine having a separately excitable rotor and stator by:
   exciting the rotor with direct current and the stator with a stator biasing current at the same time to generate magnetic flux in the rotor via two separate paths;
   terminate the stator biasing current when a desired magnetic flux is generated in the rotor;
   providing a stator flux to the stator such that the electric machine provides torque; and
   controlling the electric machine to an OFF state by terminating the direct current to the rotor and the stator flux.

17. The non-transitory computer-readable medium of claim 16, wherein providing the stator flux to the stator causes the electric machine to provide a pulse of torque.

* * * * *